United States Patent [19]

Matsumoto

[11] Patent Number: 5,550,695
[45] Date of Patent: Aug. 27, 1996

[54] MAGNETIC DISK APPARATUS INCLUDING MAGNETIC HEAD UNLOADING MECHANISM

[75] Inventor: Takashi Matsumoto, Kawasaki, Japan

[73] Assignee: Fujitsu Limited, Japan

[21] Appl. No.: 346,583

[22] Filed: Nov. 29, 1994

Related U.S. Application Data

[63] Continuation of Ser. No. 60,402, May 11, 1993, abandoned.

[30] Foreign Application Priority Data

May 15, 1992 [JP] Japan .................................... 4-123483

[51] Int. Cl.$^6$ ........................................................ G11B 5/54
[52] U.S. Cl. ............................................................ 360/105
[58] Field of Search ...................................... 360/105, 106, 360/104, 103

[56] References Cited

U.S. PATENT DOCUMENTS

| | | | |
|---|---|---|---|
| 4,703,376 | 10/1987 | Edwards et al. | 360/106 |
| 5,189,575 | 2/1993 | Onooka et al. | 360/105 |
| 5,231,549 | 7/1993 | Morehouse et al. | 360/105 |

FOREIGN PATENT DOCUMENTS

| | | | |
|---|---|---|---|
| 2-66784 | 3/1990 | Japan | 360/105 |

OTHER PUBLICATIONS

Hashimoto et al, *Development of a New Sub–Sub Micron Flying Ramp–Loading Head with Emphasis on Slider Roll Control Capability*, IEEE Transactions On Magnetics, vol. 28, No. 5, Sep. 1992, pp. 2536–2538.

*Primary Examiner*—Stuart S. Levy
*Assistant Examiner*—William R. Korzuch
*Attorney, Agent, or Firm*—Greer, Burns & Crain, Ltd.

[57] ABSTRACT

A magnetic disk apparatus having an unloading member for unloading a magnetic head from the surface of the magnetic disk when the driving of the same is stopped. One end of a spring arm has a magnetic head attached thereto and the other end of the spring arm is joined to a head arm which is rotated by a voice coil motor. The unloading member is set up on the base for rotation in a plane parallel to the plane of rotation of the head arm and has a first arm whose one end is capable of slide contacting the spring arm and a second arm whose one end is capable of abutting on the head arm. The one end of the first arm is beveled to facilitate its slide contact with the spring arm. The second arm of the unloading member is urged by a torsion spring in the direction of the head arm. When the driving is stopped, the magnetic head is moved to the outer side of the magnetic disk, so that the head arm abuts on the one end of the second arm. Thereby, the one end of the first arm is rotated toward the magnetic head so that the spring arm comes into slide contact with the beveled end of the first arm and goes on the first arm and, thus, the magnetic head becomes supported by the unloading member.

11 Claims, 6 Drawing Sheets

MAGNETIC DISK APPARATUS INCLUDING MAGNETIC HEAD UNLOADING MECHANISM

RELATED APPLICATION

This is a continuation of application Ser. No. 08/060,402, filed on May 11, 1993 now abandoned.

BACKGROUND OF THE INVENTION

1. Field of the Invention

The present invention relates generally to a magnetic disk apparatus and more particularly to a magnetic head unloading mechanism for use in a magnetic disk apparatus.

2. Description of the Related Art

There have recently been increasing demands for a magnetic disk apparatus of smaller size and with greater storage capacity as one of the computer external memories. One of the methods to realize greater capacity of the magnetic disk apparatus is to increase the number of magnetic disks put on the spindle and, in order to implement this method, the mounting distance of the magnetic disks in the magnetic disk apparatus is becoming smaller of late. Generally, a magnetic disk apparatus includes a rotatively driven spindle, a plurality of magnetic disks put on the spindle, a plurality of magnetic heads for writing data into the magnetic disk and reading data recorded on the magnetic disk, a plurality of spring arms each of which supports a magnetic head, a plurality of head arms each of which is joined at its end with each spring arm and fitted to an actuator shaft for rotation round the same, and an actuator for rotating the head arm.

In a magnetic disk apparatus for a computer, a floating magnetic head is being used to avoid damage from being caused by the contact between the head and the magnetic disk medium. By balance of the force for floating the head due to air flow generated by the magnetic disk rotating at a high speed (for example, 3600 rpm) and the force of the spring arm pressing the head against the disk, the magnetic head is floated above the magnetic disk with a fine gap (approximately 0.15 μm) held therebetween and in such a state performs read/write of data on the magnetic disk. When the rotation of the magnetic disk is stopped, the magnetic head comes to contact the magnetic disk urged by the spring force of the spring arm. Since the surfaces of the magnetic disk and the magnetic head are both finished in mirror surface, the magnetic head tightly adheres to the magnetic disk. Therefore, when the magnetic disk is rotated at the time of restarting the apparatus, overload is placed on the spindle motor and, if then it is attempted to rotate the disk by force, there are dangers of breakage of the magnetic head and/or damage on the surface of the magnetic disk. Especially when a small and low-torque spindle motor is used in the latest magnetic disk apparatus which is smaller in size and designed for greater energy saving, it poses a serious problem to restart the apparatus when the magnetic head has adhered to the magnetic disk.

In order to solve the above mentioned problems, there is known a magnetic head unloading mechanism, in which, at the time when the apparatus is stopped, the magnetic head is separated by force from the magnetic disk. Referring to FIG. 1, an example of conventional magnetic head unloading mechanism will be described below. In the vicinity of the magnetic disk 1 rotated at a high speed (for example, 3600 rpm), there is disposed an actuator assembly 2 adapted to swing so as to cross the tracks of the magnetic disk 1. At the distal end of a spring arm 3 of the actuator assembly 2, there is provided a magnetic head 4 performing read/write of data on the magnetic disk 1. In the vicinity of the magnetic disk 1 and within the turning radius of the actuator assembly 2, there is disposed a bar 5 with a slant face 5a formed at its distal end with which the spring arm 3 can make slide contact. The portion of the slant face 5a of the bar 5 is arranged in a taper form becoming gradually narrowed toward the tip.

When the disk 1 is rotated on high speed the magnetic head 4 is slightly floated above the magnetic disk 1. As the actuator assembly 2 swings, the magnetic head 4 is moved to a position over the target track of the magnetic disk i and performs read/write of data on the magnetic disk 1. When the apparatus is stopped, the actuator assembly 2 is swung in the direction of the bar 5 so that the spring arm 3 goes on the slant face 5a of the bar 5. Thus, the end portion of the actuator assembly 2 is supported by the bar 5 with the magnetic head 4 separated from the magnetic disk 1. When the apparatus is restarted, the magnetic disk 1 is rotated on high speed again and the actuator assembly 2 is swung in the direction of the magnetic disk 1 and, thereupon, the magnetic head 4 performs read/write of data on the magnetic disk 1.

With the conventional head unloading mechanism as described above, a large turning angle of the actuator assembly 2 is required for unloading the magnetic head 4 with the bar 5. Hence, there arises a problem that a large space becomes necessary and it hinders the magnetic disk apparatus from being made smaller in size.

Referring to FIG. 2, another example of conventional head unloading mechanism will be described below. In this example, a solenoid 6 is disposed in the vicinity of the magnetic disk 1 and a plunger 7 is adapted to be driven by the solenoid 6. The end of the plunger 7 is formed to become gradually narrowed toward its tip and have a slant face 7a thereon, with which the spring arm 3 of the actuator assembly 2 can make slide contact.

When the magnetic disk 1 is rotated on high speed, the magnetic head 4 slightly floats above the magnetic disk 1. The actuator assembly 2 swings so that the magnetic head 4 is moved to a position over a desired track of the magnetic disk 1 and, thereupon, the magnetic head 4 performs read/write of data on the magnetic disk 1. When the apparatus is stopped, the actuator assembly 2 is swung in the direction of the solenoid 6. The solenoid 6 drives the plunger 7 in the direction of the magnetic disk 1 so that the spring arm 3 goes on the slant face 7a of the plunger 7 and, thus, the distal end portion of the actuator assembly 2 becomes supported on the plunger 7 with the magnetic head 4 separated from the magnetic disk 1. When the apparatus is restatted, the magnetic disk 1 is rotatively driven on high speed again and the actuator assembly 2 is swung in the direction of the magnetic disk 1 and, thereupon, the magnetic head 4 performs read/write of data on the magnetic disk 1.

According to this example of conventional design, the turning angle of the actuator assembly 2 can be made smaller than that in the example of conventional desion shown in FIG. 1 because the plunger 7 driven by the solenoid 6 moves toward the actuator assembly 2 to receive it at the time of the head unloading. However, in the present example, mechanism and power for driving the solenoid 6 come to be required.

SUMMARY OF THE INVENTION

Accordingly an object of the present invention is to provide a magnetic disk apparatus including a head unloading mechanism which is simple in structure and achieves space saving.

In accordance with an aspect of the present invention, there is provided a magnetic disk apparatus comprising a base; a spindle erected for rotation on the base; drive means for rotating the spindle; a magnetic disk put on the spindle; a magnetic head for performing write/read of data on the magnetic disk; a head arm; supporting means for supporting the head arm for rotation on the base; a spring arm joined at its one end to one end of the head arm, the spring arm having the other end supporting the magnetic head; actuator means for rotating the head arm, the actuator means being operatively coupled with the other end of the head arm; an unloading member set up on the base for rotation in a plane parallel to the plane of rotation of the head arm, the unloading member including a first arm with one end capable of slide contacting the spring arm and a second arm with one end capable of abutting on the head arm, the first and second arms being joined together at the other ends, the first arm having the one end beveled to facilitate its slide contact with the spring arm; and urge means for urging the second arm of the unloading member in the direction of the head arm.

Preferably the spring-arm has a protrusion formed at its other end and the first arm of the unloading member has a recess engageable with the protrusion formed at its one end. The urge means is constituted of a torsion spring of which one end is locked to the base, the intermediate portion is wound round the cylindrical boss of the unloading member, and the other end is locked to the head unloading member.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Figure 1:
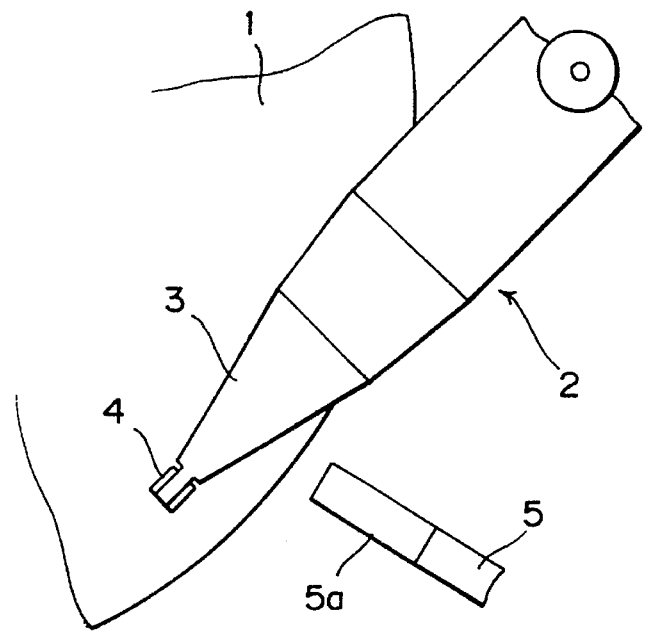
FIG. 1 is a schematic plan view showing a head unloading mechanism of a conventional design.
Figure 2:
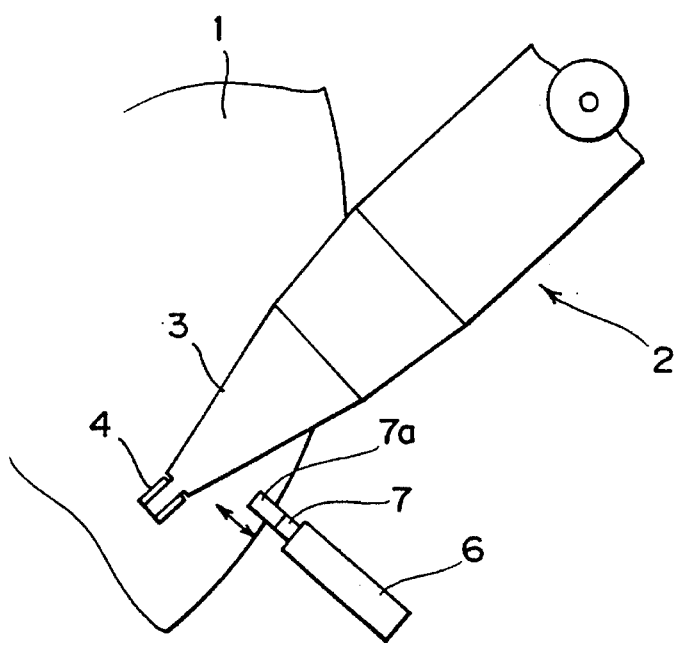
FIG. 2 is a schematic plan view showing a head unloading mechanism of another conventional design.
Figure 3:
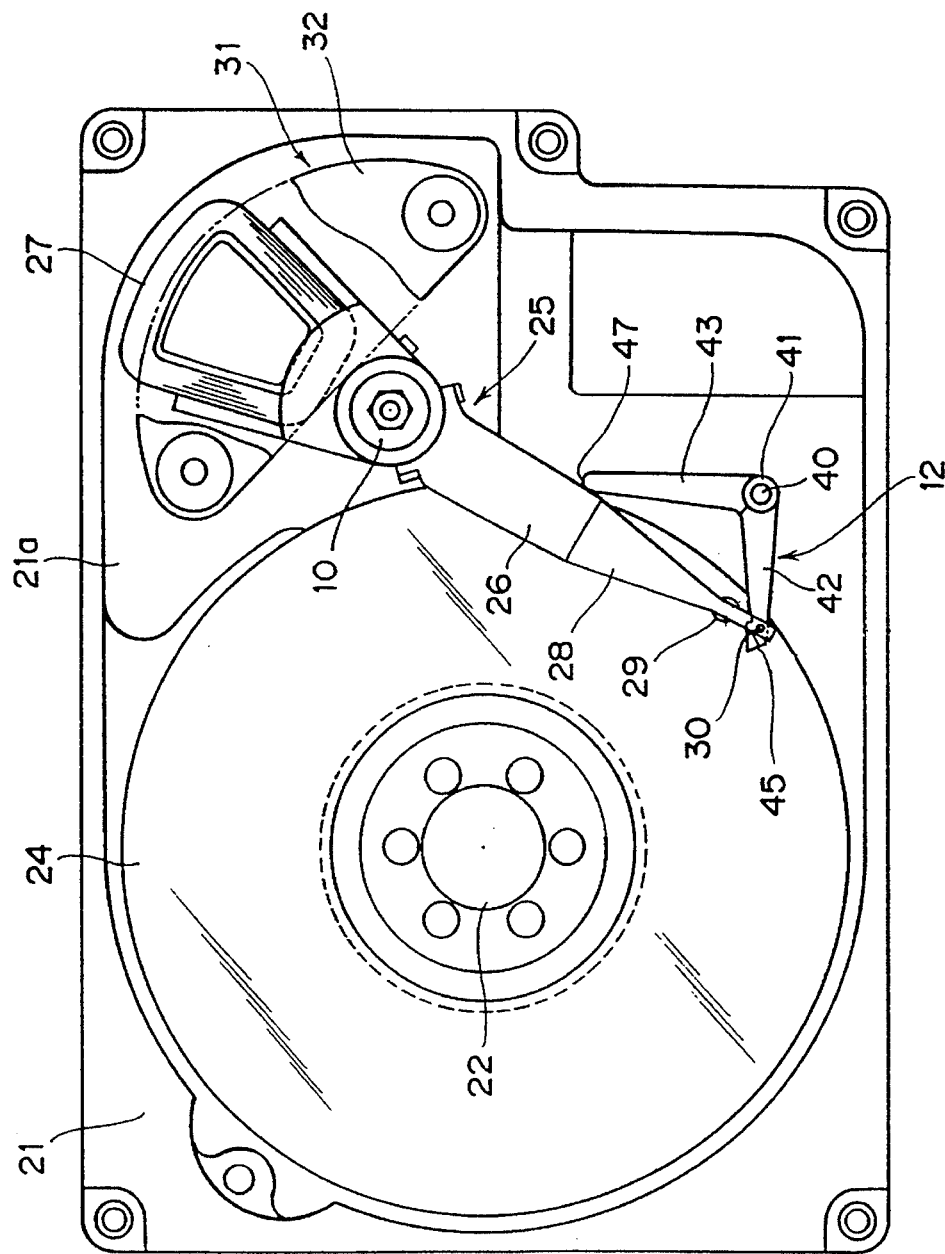
FIG. 3 is a plan view of a magnetic disk apparatus including a head unloading mechanism according to an embodiment of the present invention.
Figure 4:
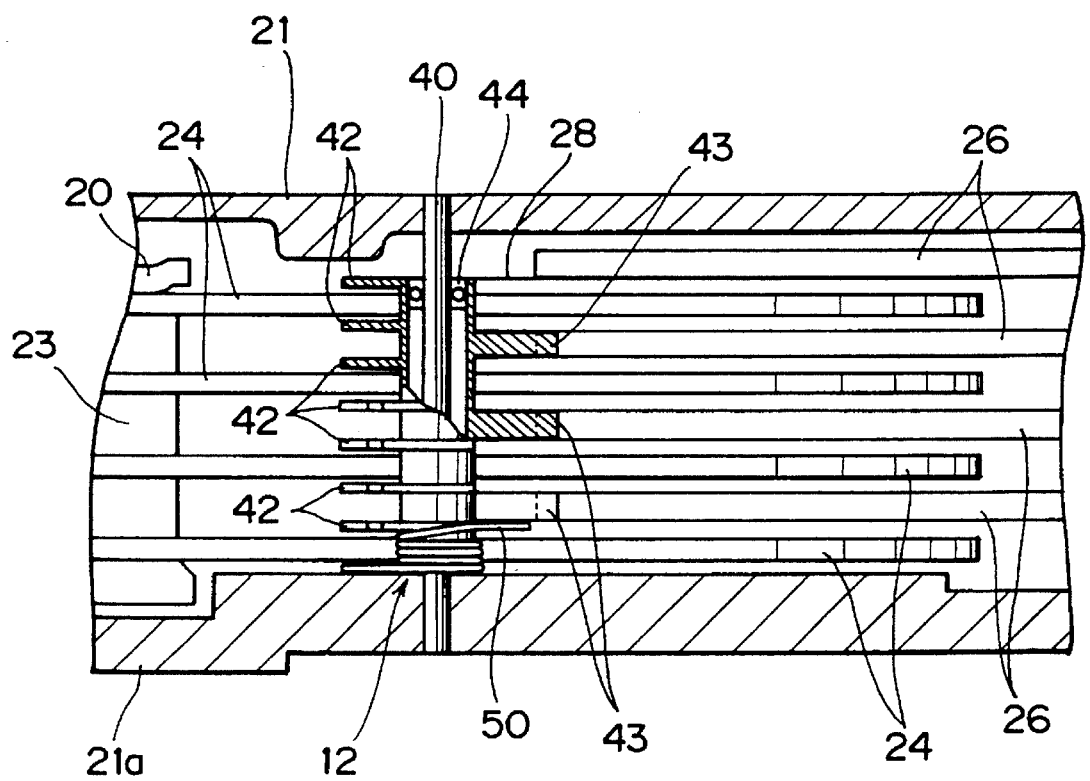
FIG. 4 is a side view partly in section of a magnetic disk apparatus shown in FIG. 3.

Referring to FIG. 3, there is shown a plan view of a magnetic disk apparatus according to an embodiment of the present invention. A spindle 22 is rotatably attached to the base 21a of the enclosure 21. The spindle 22 is rotated at a high speed (for example 3600 rpm) by a spindle motor, not shown, set up on the base 21a and coupled with the spindle 22. As shown in FIG. 4, magnetic disks 24 and annular spacers 23 are alternately inserted in the spindle 22 so that a plurality of magnetic disks 24 are put on the spindle 22 spaced a predetermined distance apart. By fastening a disk clamp 20 to the spindle 22 by a screw, each magnetic disk 24 is clamped between the annular spacers 23 and fixed to the spindle 22.

Reference numeral 25 (FIG. 3) denotes an actuator assembly provided for rotation round a shaft 10 erected on the base 21a of the enclosure 21. The actuator assembly 25 has head arms 26 corresponding in number to the magnetic disks 24, and each head arm 26 is rotatably put on the shaft 10 and swung in the direction to cross the tracks of the magnetic disk 24. There is provided a coil 27 on the opposite side of the head arm 26 with respect to the shaft 10.

Each of the head arms 26, except the topmost head arm 26, has a pair of spring arms 28 fixed to its distal end. To the distal end of the topmost head arm 26 is fixed a single spring arm 28. Each spring arm 28 has a magnetic head 29 attached to its distal end for performing read/write of data on the magnetic disk 24. On the side of the head 29 at the distal end of each spring arm 28, there is formed a protrusion 30 in the straight line passing through the center of the head 29. Reference numeral 31 denotes a voice coil motor which is made up of a yoke 32 attached to the base 21a of the enclosure 21, a magnet not shown, and a coil 27 fixed to the extended portion of the head arm 26. The head arm 26 is rotated clockwise or counterclockwise dependent on the direction of the current passed through the coil 27.

As shown in FIG. 4, a pin 40 is erected on the base 21a. To this pin 40, an unloading member 12 is attached for rotation through a bearing 44. The unloading member 12 has a cylindrical boss 41 rotatably put on the pin 40 through the bearing 44, first arms 42 of the same number as the magnetic heads 29 horizontally extending from the cylindrical boss 41, and second arms 43 of the same number as the head arms 26 horizontally extending from the cylindrical boss 41 virtually in the opposite direction to the first arm 42.

Figure 5:
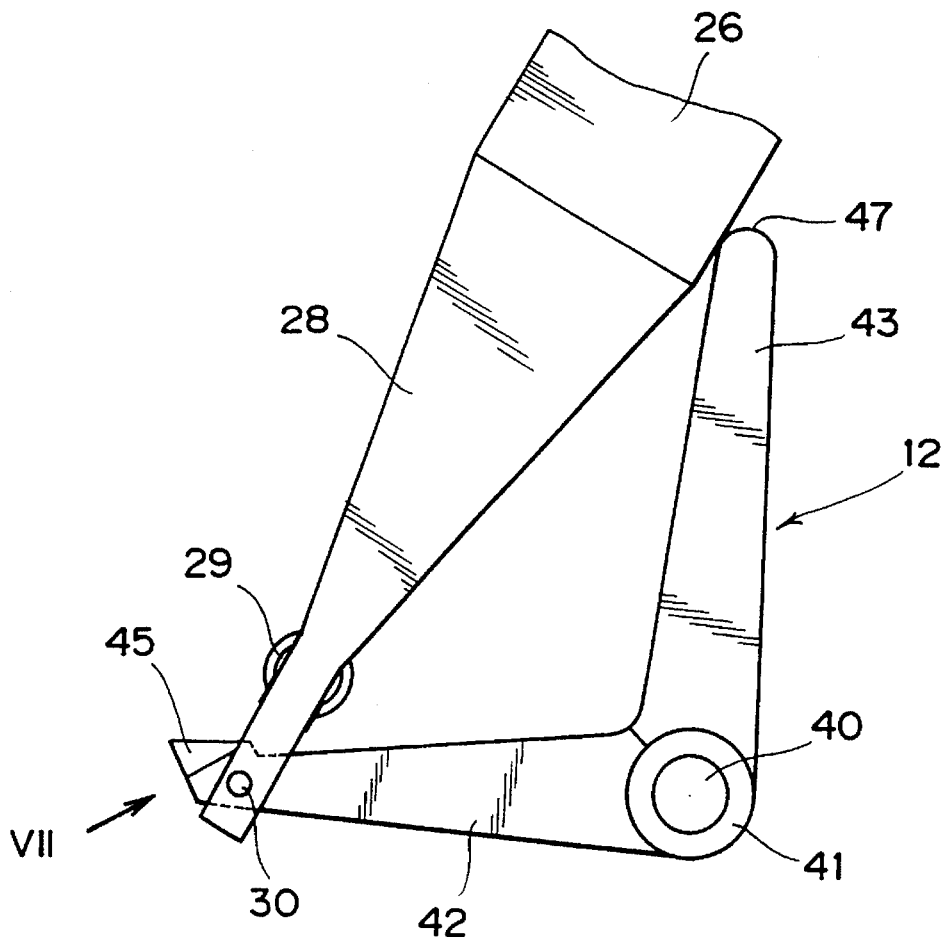
FIG. 5 is a schematic plan view showing a head unloading mechanism and a part of an actuator assembly according to an embodiment of the invention.

As shown in FIG. 5, the first arm 42 and the second arm 43 are fixed to the cylindrical boss 41 so as to form virtually a V shape. As an alternative, the first arm 42, the second arm 43, and the cylindrical boss 41 may be integrally formed. As apparent from FIG. 6 and FIG. 7, there is formed a slant face 45 at the distal end of the first arm 42 such that the end portion becomes narrowed toward the tip and a recess 46 engageable with the protrusion 30 on the spring arm 28. The end of the second arm 43 is formed in a cylindrical surface 47 and this cylindrical surface 47 is arranged to make line contact with the side of the head arm 26 such that the second arm 43 smoothly abuts on the head arm 26.

Figure 6:
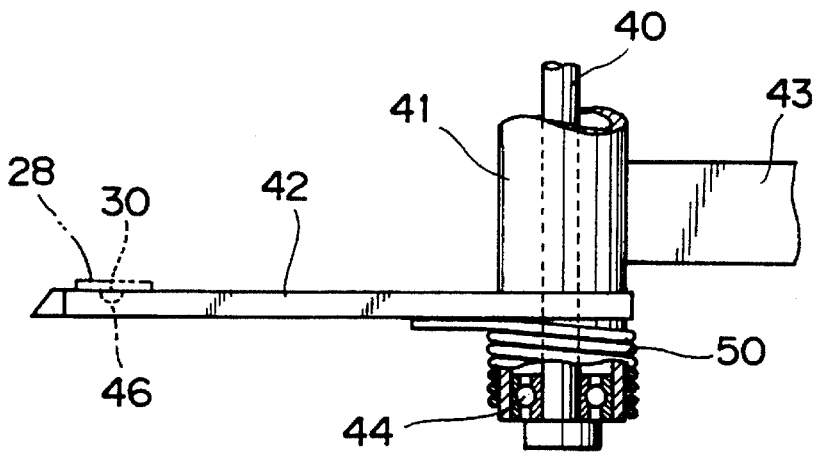
FIG. 6 is a side view with a portion broken away of a head unloading mechanism according to an embodiment of the invention, showing only the bottommost first arm and second arm.
Figure 7:
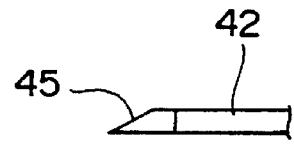
FIG. 7 is a view of the end of the first arm in the direction of the arrow VII in FIG. 5.

As shown in FIG. 4, one end of a torsion coil spring 50 is locked to the base 21a, the intermediate portion of the same is wound round the cylindrical boss 40, and the other end of the same is locked to the under side of the bottommost second arm 43. The torsion coil spring 50 urges the unloading member 12 in a counterclockwise direction. More specifically, it urges the cylindrical end face 47 of the second arm 43 in the direction of the head arm 26. Instead of locking the other end of the torsion coil spring 50 to the bottommost second arm 43 as shown in FIG. 4, it may be locked to the under side of the bottommost first arm 42 as shown in FIG. 6.

Figure 8:
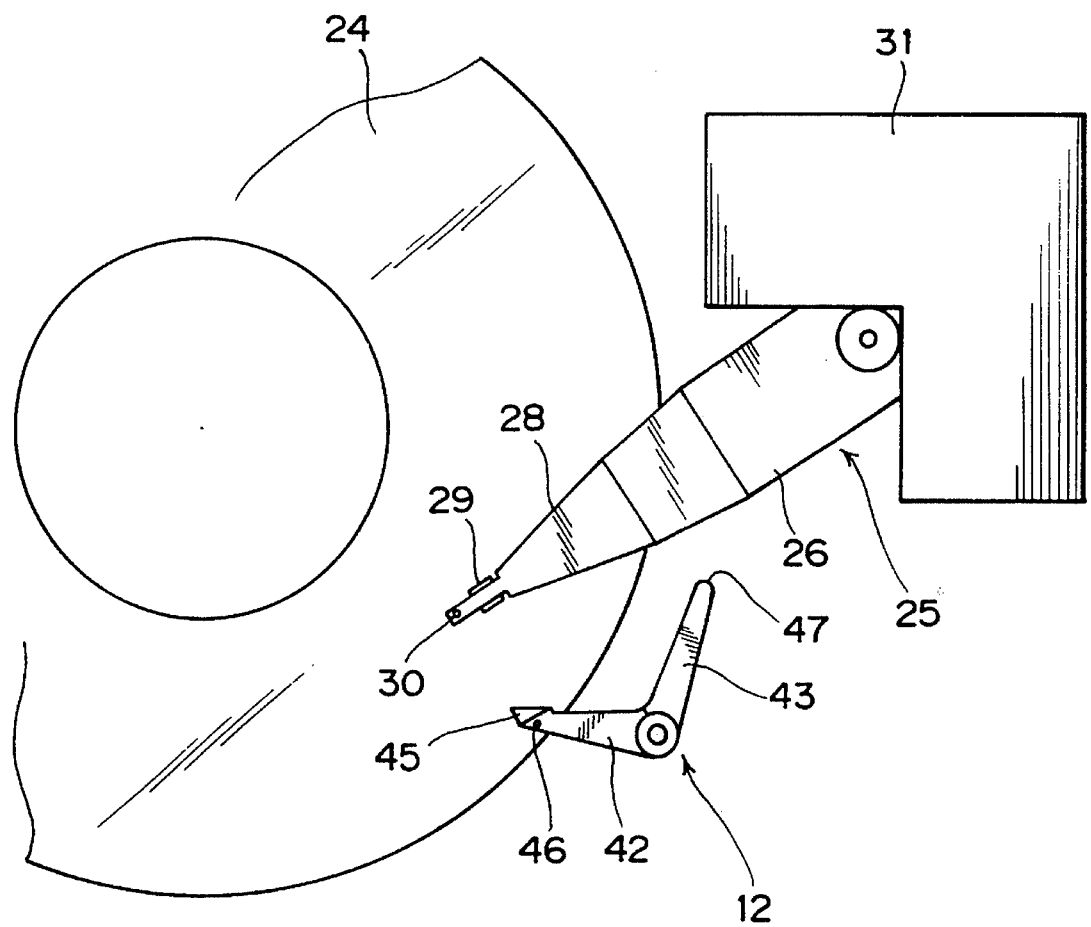
FIG. 8 is a schematic plan view explanatory of operation of an embodiment of the invention, showing a state where the magnetic head is loaded on the magnetic disk.
Figure 9:
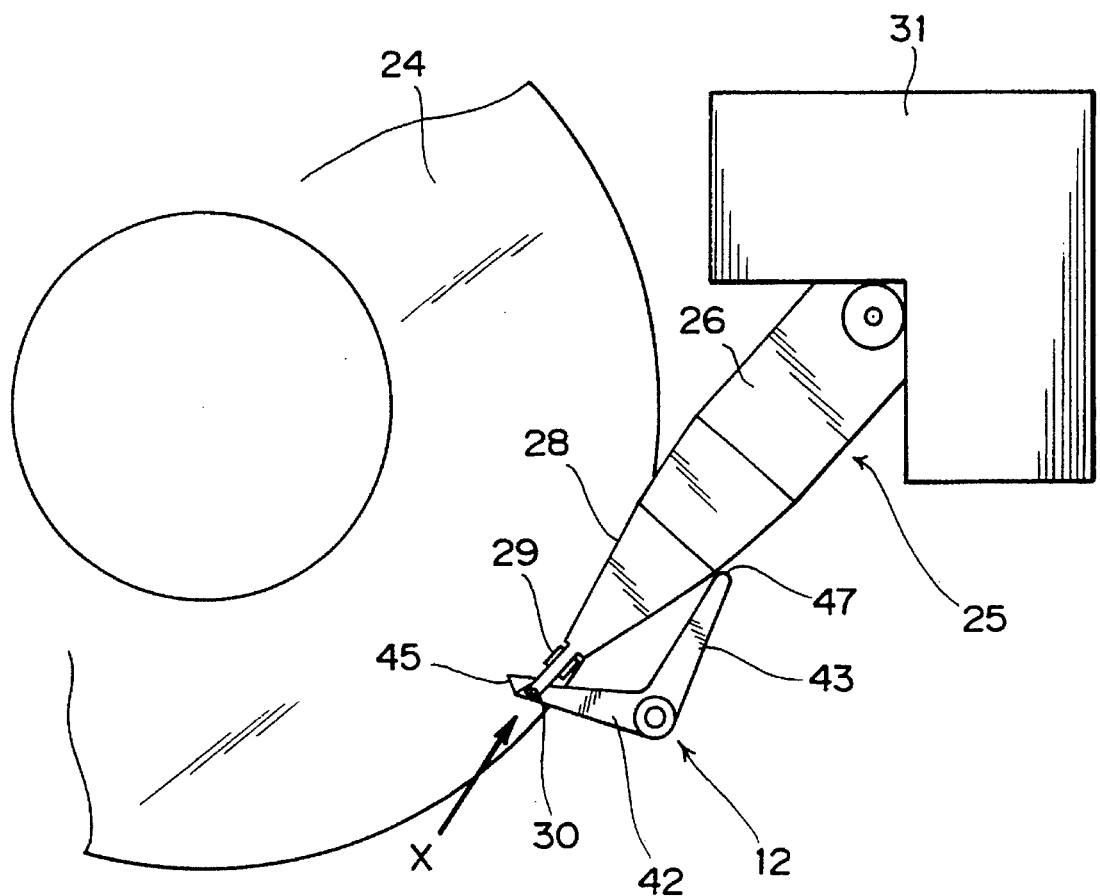
FIG. 9 is a plan view similar to FIG. 8 showing a state where the magnetic head is supported on the head unloading mechanism of the embodiment.
Figure 10:
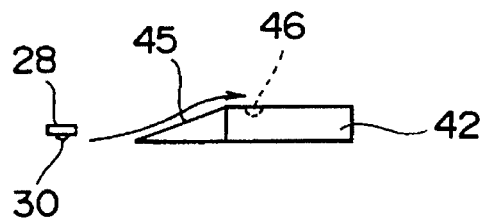
FIG. 10 is a view of the end of the first arm in the direction of the arrow X in FIG. 9.

Operation of the above described embodiment will be described below with reference to FIG. 8 to FIG. 10. FIG. 8 shows a state of the magnetic disk apparatus in operation with the magnetic disk 24 rotated at high speed by a spindle motor. When a current is passed through the coil 27 of the voice coil motor 31, thrust is generated by the coil 27 and, thereby, the actuator assembly 25 is swung clockwise round the shaft 10 so that the head 29 is moved to a position over the desired track of the magnetic disk 24. The magnetic head 29, floating over the surface of the magnetic disk 24 with a fine gap (approximately 1.5 μm) held therebetween by balance of the force of floatation due to an air flow generated by the magnetic disk 24 rotating on high speed and the force of the spring arm 28 pressing the magnetic head 29 against the magnetic disk 24, performs read/write of data on the magnetic disk 24.

To stop the apparatus in the state shown in FIG. 8, the driving current supplied to the spindle motor is cut off and, virtually at the same time, a current in the opposite direction is supplied to the coil 27 for a predetermined length of time. The magnetic head 29, while being floated by virtue of the magnetic disk 24 keeping on rotating by the force of inertia, rotates counterclockwise and moves to the outer side of the magnetic disk 24. Then, the side of the head arm 26 of the actuator assembly 25 pushes the cylindrical surface 47 of the second arm 43 of the head unloading member 12. Accordingly, the unloading member 12 rotates clockwise against the urging force of the spring 50, so that the slant face 45 of the first arm 42 comes into slide contact with the under side of the distal end of the spring arm 28 as shown in FIG. 10 and the spring arm 28 is thereby brought on the first arm 42 as shown in FIG. 9. The protrusion 30 on the spring arm 28 engages the recess 46 formed in the first arm 42 and, thus, the magnetic head 29 comes to be supported by the head unloading member 12, separated from the magnetic disk 24.

When the magnetic disk apparatus is put into operation again, the magnetic disk 24 is rotated on high speed and the actuator assembly 25 is swung clockwise and, accordingly, the protrusion 30 is disengaged from the recess 46. When the actuator assembly 25 is further swung, the head arm 26 is released from the state in abutment with the cylindrical end surface 47 of the second arm 43 of the head unloading member 12 so that the head unloading member 12 is returned to its original position by the urging force of the spring 50.

Since the present embodiment is not using such parts as a solenoid and the like used in the conventional head unloading mechanisms, it simplifies the structure of the apparatus and achieves power saving. Further, when the head is unloaded, the first arm 42 of the head unloading member 12 approaches the magnetic head 29 to receive it and, hence, the range of movement of the mechanism is reduced and saving in space can be achieved. Since the protrusion 30 engages the recess 46 while the magnetic head 29 is unloaded, the magnetic head 29 can be firmly supported by the unloading member 12.

Further, since the end of the second arm 43 of the head unloading member 12 is formed in the cylindrical surface 47, the contact between the end of the second arm 43 and the head arm 26 becomes line contact. Hence, the pressing of the head arm 26 against the unloading member 12 is performed smoothly. Furthermore, since the protrusion 30 formed in the center line of the head 29 attached to the spring arm 28 comes into slide contact with the slant face 45 of the first arm 42, the head arm 26 is prevented from being twisted.

When a power failure occurs while the magnetic head 29 is doing write/read of data on the magnetic disk 24, there is a danger of the magnetic head 29 coming into contact with the magnetic disk 24 because the force of floatation of the magnetic head 29 disappears. To prevent this, it is arranged such that a back electromotive force is produced by the spindle 22 rotating by the force of inertia and the voice coil motor 31 is driven thereby to rotate the actuator assembly 25 counterclockwise to cause the head unloading member 12 to catch the head 29. As an alternative, the actuator assembly 25 may be arranged to be urged at all times by means of a torsion coil spring.

Although, in the above described embodiment, the protrusion 30 was formed on the under side of the spring arm 28 and the recess 46 was formed in the first arm 42, the positions of the protrusion and the recess may be reversed.

What is claimed is:

1. A magnetic disk apparatus comprising:

a base;

a spindle erected for rotation on said base;

drive means for rotating said spindle;

a magnetic head for performing write/read of data on a magnetic disk that is rotated by said spindle;

a head arm;

supporting means for supporting said head arm for rotation on said base;

a spring arm joined at its one end to one end of said head arm, said spring arm having the other end supporting said magnetic head;

actuator means for rotating said head arm, said actuator means being operatively coupled with the other end of said head arm;

an unloading member set up on said base for rotation in a plane parallel to the plane of rotation of said head arm, said unloading member including a first arm with one end capable of slidably contacting said spring arm, and a second arm with one end capable of abutting on said head arm, said first and second arms being joined together at the other ends, whereby a force of said head arm on said one end of said second arm causes said one end of said first arm to rotate toward contact with said spring arm to unload said magnetic head from said magnetic disk, said first arm having the one end beveled to facilitate its slide contact with the spring arm; and urge means for urging said second arm of said unloading member in the direction of said head arm.

2. A magnetic disk apparatus according to claim 1, wherein said spring arm, while said magnetic disk is at a standstill, urges said magnetic head to abut on said magnetic disk and, when said magnetic disk is put into rotation, allows said magnetic head to float above said magnetic disk by dynamic pressure of an air flow caused by the rotation of said magnetic disk.

3. A magnetic disk apparatus according to claim 2, wherein said spring arm has a protrusion formed at its other end and said first arm has a recess engageable with said protrusion formed at its one end.

4. A magnetic disk apparatus according to claim 2, wherein said one end of said second arm is formed as a cylindrical surface.

5. A magnetic disk apparatus according to claim 2, wherein said unloading member has a cylindrical boss disposed concentrically with its center of rotation, and said urge means is a torsion spring of which one end is locked to said base, the intermediate portion is wound round said cylindrical boss, and the other end is locked to said unloading member.

6. A magnetic disk apparatus according to claim 2 wherein said spring arm has a first engaging means formed at the other end thereof and said first arm has a second engaging means formed at said one end thereof, said first engaging means being engagable with said second engaging means.

7. A magnetic disk apparatus according to claim 1, wherein abutment of said second arm against said head arm initiates said slide contact by moving said beveled end of said first arm toward said spring arm.

8. A magnetic disk apparatus according to claim 7, wherein said first and second arms are separately formed and configured so that movement of said second arm causes the other end of the second arm to push against the other end of the first arm to cause corresponding movement of said first arm.

9. A magnetic disk apparatus comprising:

a base;

a spindle erected for rotation on said base;

drive means for rotating said spindle;

a magnetic head for performing write/read of data on a magnetic disk that is rotated by said spindle;

a head arm;

supporting means for supporting said head arm for rotation on said base;

a spring arm joined at its one end to one end of said head arm, said spring arm having the other end supporting said magnetic head;

actuator means for rotating said head arm, said actuator means being operatively coupled with the other end of said head arm; and a generally V-shaped unloading member mounted at a center portion thereof to said base for rotation in a plane parallel to the plane of rotation of said head arm, said unloading member having first and second arm portions extending from said center portion, a first end defined on said first arm portion at a region of said first arm portion furthest from said center portion for slidably contacting said spring arm, a second end defined on said second arm portion at a region of said second arm portion furthest from said center portion and for abutment contact with said head arm;

wherein said abutment contact of said second end with said head arm causes said rotation of said unloading member in said plane about said center portion to move said first end toward said spring arm for said slide contact of said first end with said spring arm to unload said magnetic head from said magnetic disk.

10. A magnetic disk apparatus according to claim 9, wherein said unloading member is integrally formed.

11. A magnetic disk apparatus according to claim 9, wherein said first and second arm portions are formed separately and are connected at said center portion.

* * * * *

UNITED STATES PATENT AND TRADEMARK OFFICE
CERTIFICATE OF CORRECTION

PATENT NO. : 5,550,695
DATED : August 27, 1996
INVENTOR(S) : Matsumoto

It is certified that error appears in the above-indentified patent and that said Letters Patent is hereby corrected as shown below:

Column 2, line 13, delete "disk i" and insert -

-disk 1--.

Column 2, line 58, delete "desion" and insert

--design--.

Signed and Sealed this

Twenty-third Day of September, 1997

Attest:

BRUCE LEHMAN

Attesting Officer

Commissioner of Patents and Trademarks